United States Patent [19]

Harrington

[11] Patent Number: 5,736,831
[45] Date of Patent: Apr. 7, 1998

[54] POWER LIMITING CIRCUIT FOR ELECTRIC VEHICLE BATTERY CHARGER

[75] Inventor: William S. Harrington, Crownsville, Md.

[73] Assignee: Northrop Grumman Corporation, Los Angeles, Calif.

[21] Appl. No.: 701,599

[22] Filed: Aug. 22, 1996

[51] Int. Cl.$^6$ ............................... H01M 10/44; H02J 7/04
[52] U.S. Cl. .................... 320/9; 320/21; 320/39
[58] Field of Search ................ 363/20, 95; 320/9, 320/10, 13, 21, 22, 27, 30, 39, 49

[56] References Cited

U.S. PATENT DOCUMENTS

| | | | |
|---|---|---|---|
| 4,275,344 | 6/1981 | Mori et al. | 322/28 |
| 5,289,101 | 2/1994 | Furuta et al. | 320/21 |
| 5,371,456 | 12/1994 | Brainard | 320/31 |
| 5,382,893 | 1/1995 | Dehnel | 320/32 |
| 5,486,749 | 1/1996 | Brainard | 320/9 |
| 5,561,361 | 10/1996 | Sengupta et al. | 320/14 |
| 5,581,171 | 12/1996 | Kerfoot et al. | 320/39 |
| 5,619,117 | 4/1997 | Koenck | 320/21 |

Primary Examiner—Peter S. Wong
Assistant Examiner—Gregory J. Toatley, Jr.
Attorney, Agent, or Firm—Walter G. Sutcliff

[57] ABSTRACT

In an electric vehicle battery charging system where the batteries of an electric vehicle are charged from an external power source including a battery energy management system which monitors the vehicle batteries and develops a current control command representing the current to be supplied to the vehicle batteries and a controllable charger having a design power limit supplies current under command of the current command at a voltage of the vehicle batteries, a charger power limiting circuit is provided and includes a voltage sensor, and a circuit for modifying the current control command to limit power to be low at least in approximation of the designed power limit of the charger. The current control command modifying circuit modifies the current control command from the BEMS to ensure that the controllable charger will not supply power to the batteries in excess of the controllable chargers design power. The charger power limiting circuit includes a power limiting characteristic defining circuit, a current limiting feedback circuit and a power limiting characteristic defining circuit. The voltage of the vehicle batteries is sensed and the current control command from the battery energy management system is used as the charging current. The current control command is then modified to limit power to below at least an approximation of the design power limit of the charger.

20 Claims, 2 Drawing Sheets

POWER LIMITING CIRCUIT FOR ELECTRIC VEHICLE BATTERY CHARGER

FIELD OF INVENTION

The present application is generally directed to a power limiter for limiting the power supplied by a battery charger to one or more batteries. More particularly, the present application is directed to a power limiting circuit for limiting the power supplied by a battery charging circuit to an electric vehicle battery pack so as to prevent overload to the battery charger.

BACKGROUND OF THE INVENTION

Recently, there has been a great deal of interest in the development of electric powered vehicles. Typically, such vehicles employ one or more electric motors driven by an on board vehicle battery pack. One of the limitations of such vehicles is caused by the composition of such a battery pack. Typically, such battery packs are relatively heavy and expensive. Further, such batteries may generate current at widely varying voltages and may exhibit significant performance degradation if not charged in an optimum fashion.

Improvements in battery design make it desirable for an electric vehicle to be designed so as to employ periodically upgraded batteries. Accordingly, battery chargers have been designed which deliver a current, as commanded by a current command signal, to the battery pack under charge management control by a Battery Energy Management System (BEMS). An example of such a battery charger which supplies current to the battery pack under external control is U.S. application Ser. No. 08/258,154 now U.S. Pat. No. 5,581,171 entitled "Electric Vehicle Battery Charger" filed on Jun. 10, 1994 by Kerfoot et al. and assigned to the assignee of the instant application. Such a battery charger is exemplary of the controllable power converters such as controllable power converter 4 of FIG. 1 of the instant application and accordingly, this application is incorporated herein by reference.

Such a controllable power converter 4 is controlled by a converter control (12 in FIG. 1) to supply a current to the batteries defined by the Battery Energy Management System (BEMS) as illustrated in element 10 of FIG. 1. In such a known BEMS, the BEMS provides a current control input to the battery charger. This current input control may be based upon thermal and voltage parameters of the batter, battery chemistry, or other such useful information to control the current to be supplied to the battery to optimize battery charging time, completeness of battery charging, and the life span of the batteries.

Typically, it is desirable to apply a relatively high charge rate to the batteries to optimize battery charge time. However, battery chargers such as the controllable power converter 4 of FIG. 1, are designed to a rated power output or designed power limit. Since electric vehicles are consumer items, cost is an important factor in their design and construction. Accordingly, it is desirable to design a control power converter 4 as cheaply as possible. Such a power converter desirably should produce a current at lower voltages which, if applied to the battery at maximum design voltage for the controllable power converter without a form of current limiting, would develop a power which would substantially exceed the design power of the controllable power converter and thus would likely cause the controllable power converter 4 to thermally overload or otherwise fail.

While battery energy management systems such as BEMS 10 of FIG. 1 typically have a maximum current limit, such Battery Energy Management Systems are typically designed to match a specific battery utilized, and may be produced by a manufacturer different than the manufacture of the controllable power converter 4. Accordingly, it may not be possible for the BEMS 10 to protect the controllable power converter 4 from power overload.

In order to monitor the power supplied the vehicle batteries (6 of FIG. 1) by the controllable power converter 4, it is necessary to note both the current to be supplied to the battery and the voltage at which this current is supplied. While it is relatively simple to monitor voltage of the battery pack 6, direct measurement of current is expensive, either in cost, as for example, through the use of a hall effect sensor, or by energy consumption, as for example, through the use of a current sensing resistor in the path between the controllable power converter 4 and vehicle battery 6. Such a high power resistor for use in direct measurement of current produces large thermal loads and, in order for the current measurement to be accurate, such a resistance must be constructed to an accurate tolerance in order to accurately measure current.

In addition to the above mentioned difficulties, both methods of direct sensing require remote sensing devices and wiring back to the control circuit, as well as signal conditioning to smooth out the pulsed nature of the output current. Additionally, both approaches require the measured current to be multiplied with voltage increasing circuit complexity.

SUMMARY OF THE INVENTION

According, the present invention is directed to a power limiting circuit for electric vehicles which utilizes the current command signal used to provided optimum battery charging in place of measured current to prevent a vehicle charging circuit from exceeding its power rating.

The electric vehicle battery charging system of the present application controls the output power producible by the controllable power converter from a vehicle external source so that the power produced by this controllable power converter will not exceed the converter's maximum power rating. The system of the present application utilizes a battery energy management system to sense battery conditions to supply a battery charge current command signal representing the optimum current for charging the battery. While such a BEMS may employ current limiting, the BEMS may be manufactured by a different manufacturer than the controllable power converter 4 and accordingly, would not typically take into account the design power or rated output power of the controllable power converter. Accordingly, a power limiting circuit, in accordance with the teachings of the present application, is utilized to clamp the current command signal to produce an output current command signal which at least approximates the rated output power of the controllable power converter.

The power limiting circuit measures vehicle battery voltage but does not directly measure charge current. Instead, the power limiting circuit in accordance with the present application limits the current command signal so that the product of the current command signal and the measured battery voltage does not substantially exceed the rated output power of the controllable power converter.

The power limiting circuit in accordance with the present application utilizes a power limiting characteristic defining circuit which monitors measured vehicle battery voltage and produces an output which is representative of the acceptable current which may be supplied at that voltage. The current command signal received from the BEMS is converted to a corresponding DC voltage level and then this voltage level is selectively clamped, when necessary, to a current level corresponding to the current defined by the power limiting characteristic defining circuit by selectively reducing the gain of a variable gain amplifier under control of a selective clamping circuit employing a differential amplifier and blocking diodes.

It is thus an object of the present invention to provide a power limiting circuit tailored to the controllable power converter to prevent damage to the controllable power converter caused by providing to the converter a current command signal which will supply a charge current to the vehicle batteries substantially higher than a current which will supply the rated output power or design power limit of the controlled power converter at the battery's present voltage level.

It is accordingly an object of the present invention to provide a power limiting circuit which prevents damage to the controllable power converter utilized to charge the batteries of the vehicle.

It is a further object of the present invention to limit the current to be supplied by the controlled power converter to a level which will prevent the controllable power converter from substantially exceeding its rated output power.

It is another object of the present invention to develop a power limiting circuit for limiting the power generated by the controlled power converter, which power limiting circuit may be inexpensively manufactured.

It is a still further object of the present invention to produce a power limiting circuit as outlined above which avoids the need to directly measure charged current, thereby decreasing circuit costs.

These and other objects of the present invention are fulfilled by the present invention's battery charging system employing a power limiting circuit as will be apparent from the detailed description given hereinafter. However, it should be understood that the detailed description, while indicating a preferred embodiment of the invention, is given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description in combination with the accompanying drawings which are given by way of illustration only, and thus are not limitative of the present invention, and wherein.

DETAILED DESCRIPTION OF PREFERRED EMBODIMENTS

Figure 1:
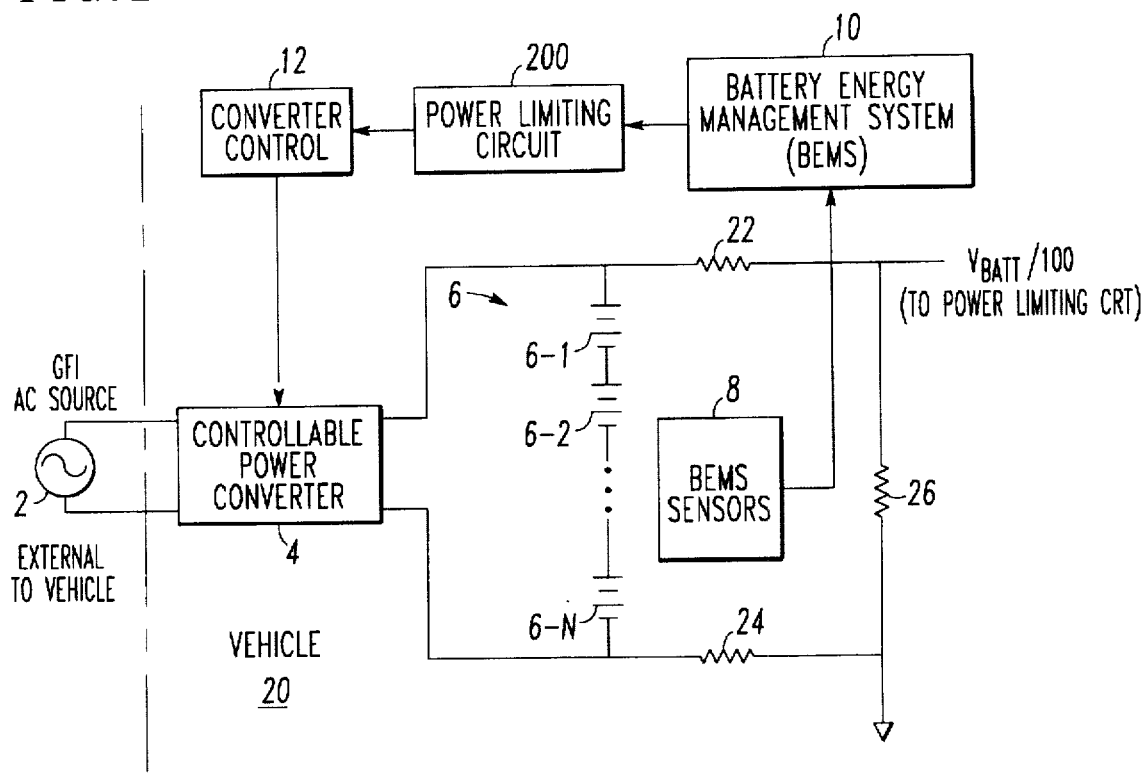
FIG. 1 is a block diagram of a battery charging system utilizing a power limiting circuit, in accordance with the teachings of the present application.

FIG. 1 illustrates a battery charging system according to the general teachings of the present application. Typically, an electric vehicle, generally indicated as 20, employs a plurality of vehicle batteries 6 including individual batteries 6-1 to 6-N, which, in one embodiment, are serially connected to produce a vehicle battery's output voltage $V_{BATT}$ of on the order of 300–600 volts. While in the preferred embodiment, a plurality of batteries are serially connected, any suitable battery configuration may be utilized in accordance with the teachings of the present application.

The vehicle battery 6 are of course used to supply power to the electric motors (not shown) of an electric vehicle. Systems for utilizing the power from the vehicle batteries to drive and electric vehicle are known and are not the subject of the present application. However, the use of such vehicle batteries to supply power to electric motors to drive the vehicle necessarily results in a discharge of the vehicle batteries 6, which batteries must be recharged from an appropriate power source.

Typically, an AC source such as ground fault interrupted (GFI) AC source 2, provided externally of the vehicle, is utilized to charge the vehicle batteries through a power conversion produced by a controllable power converter 4 as is generally known the art. In the preferred embodiment, the controllable power converter 4 is of the type disclosed in U.S. application Ser. No. 08/258,154 now U.S. Pat. No. 5,581,171 entitled "Electric Vehicle Battery Charger" which application is, to the extent necessary, hereby incorporated by reference. The controllable power converter converts the AC voltage supplied by the AC source to an appropriate DC voltage supplied at an appropriate current under control of a converter control 12. Such a converter control 12 may also be of the type generally disclosed in the above-mentioned U.S. patent application. The converter control 12 receives a current command signal, which current command signal defines a current to be supplied to the vehicle battery 6 by the controllable power converter 4.

A Battery Energy Management System (BEMS) 10 produces a current command signal defining the current to be supplied the vehicles batteries to produce optimized charging, taking in to consideration such factors as battery life and desired charge time. The BEMS 10 monitors battery conditions using one or more BEMS sensors 8 which monitor various parameters of the vehicle battery 6. For example, the BEMS sensors might monitor battery temperature, battery chemistry and a number of other parameters, including battery voltage so as to produce an optimized current command signal defining the current to be supplied to the vehicle battery 6.

Vehicle batteries are currently a weak link in the design of electric vehicles. Vehicle batteries are also undergoing rapid improvement. Since different vehicle batteries have different charge requirements, the BEMS 10 is typically tailored to a particular set of vehicle batteries 6. Accordingly, it is possible that, when the vehicle batteries are replaced due to wear, or to enhance vehicle performance, the BEMS may be changed.

A particular BEMS may be used with a variety of electric vehicles employing differing controllable power converters 4 having different design power limits. Accordingly, it is desirable to limit the current generated by the controllable power converter independent from the BEMS 10. For example, in one preferred embodiment, the BEMS will supply a maximum output current of 20 amps as illustrated by constant current portion 302 of the current vs. voltage characteristic of the rated power vs. clamp level curve of FIG. 3.

In this one exemplary embodiment, the controllable power converter 4 has a maximum rated output power of 6000 watts. Since output power corresponds to the product of output current and battery voltage, the 20 amp maximum output current may be supplied to the batteries within a maximum current allowable operating range 302 of FIG. 3 without exceeding the design power limit of the controllable power converter. At a battery voltage of 300 volts, the maximum output current produces an output power of 6000 watts, which is the rated output power of the controllable power converter 4 in this example. However, as the battery voltage exceeds the point at which maximum output current may be generated without exceeding rated output power, if the maximum output current is supplied at that battery voltage, the rated output power of the controllable power converter will be exceeded, which may result in circuit over heating and possible circuit damage. Accordingly, in accordance with the teachings of the present application, the output current at these higher battery voltages is limited to substantially that of the rated output power of the controllable power converter.

Figure 3:
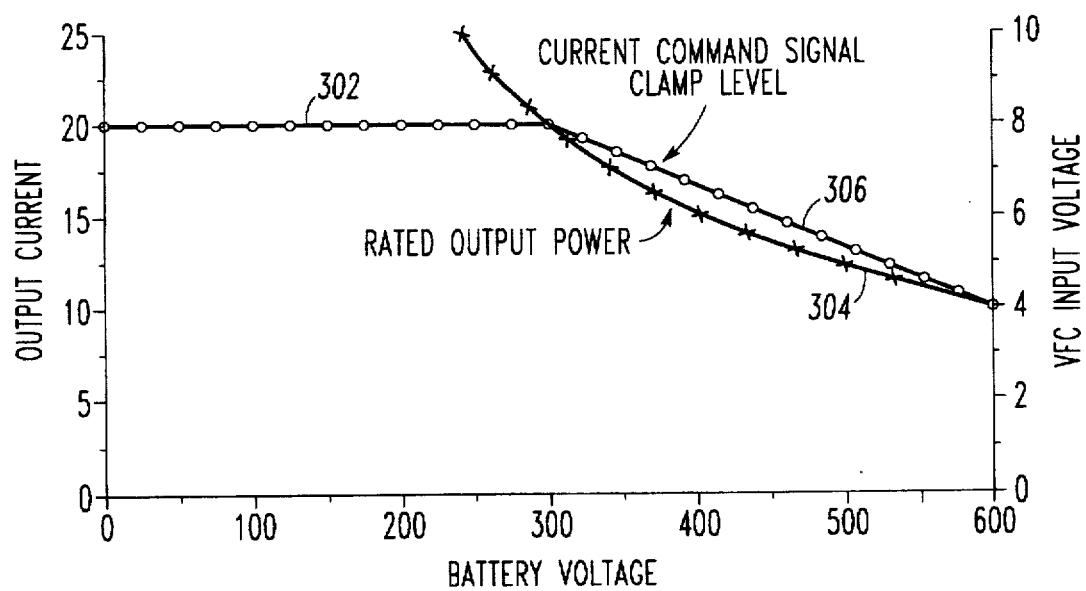
FIG. 3 is a graphical representation illustrating the clamping of the current command signal to a level substantially similar to the controllable power converter rated output power in accordance with the teachings of the present invention.

In FIG. 3, the rated output power is illustrated by a rated output power or design power limit voltage/current curve 304 which illustrates the battery voltages and related output currents which produce the rated output power of the controllable power converter. Obviously, as long as the maximum current to be supplied the battery 6 falls within the maximum current allowable operating range 302, no current limiting is necessary. However, when the maximum current to be supplied the batteries exceeds the rated output power voltage/current curve 304, some form of power limiting should be performed.

According to the teachings of the present application, the current command signal is clamped to a level illustrated by the current command signal or power limiting clamp level curve 306 of FIG. 3. This is performed by the power limiting circuit 200 as described in greater detail in relation to FIG. 2 of the present application.

Figure 2:
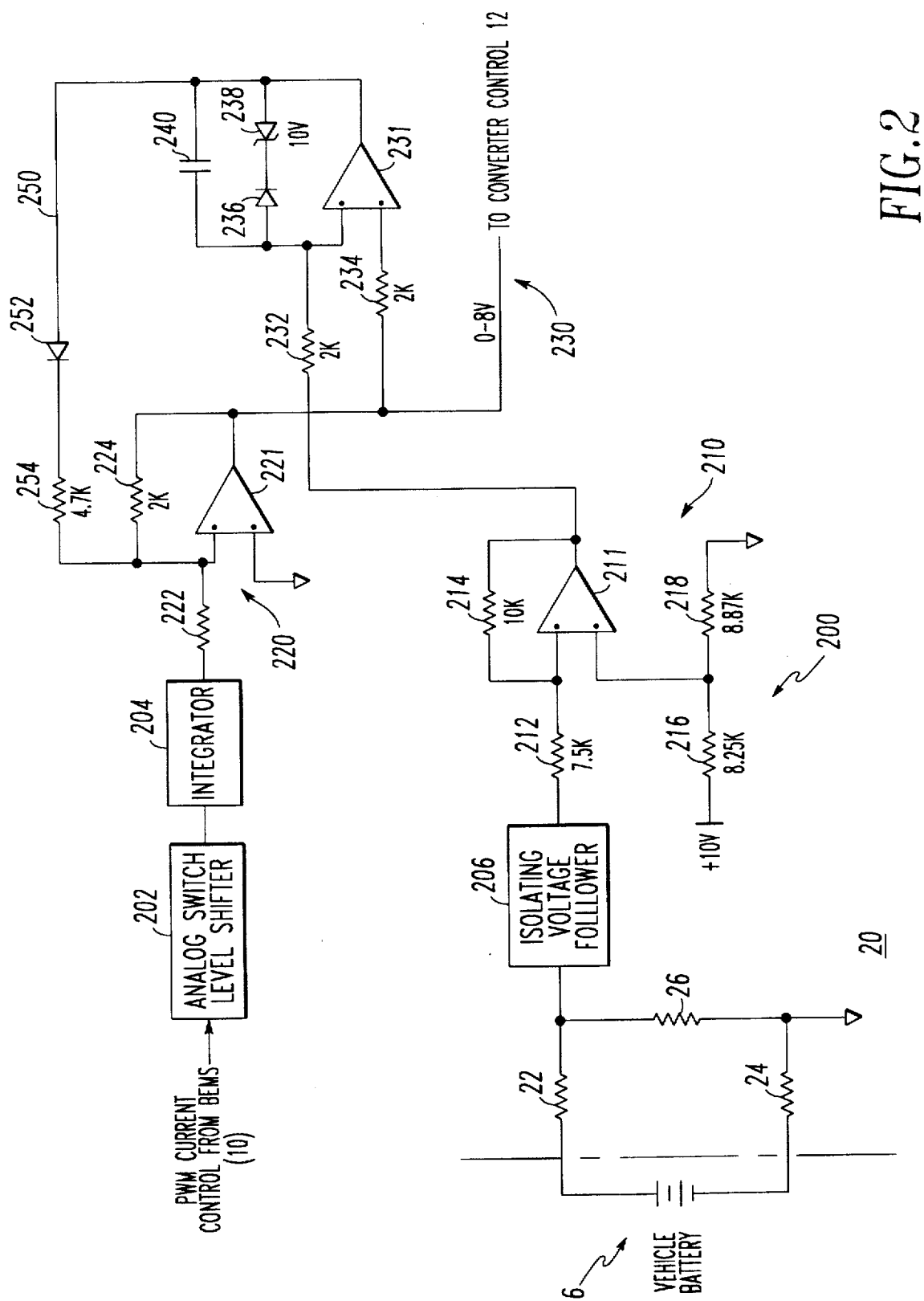
FIG. 2 is a detailed representation of the power limiting circuit 200 illustrated in FIG. 1.

A voltage divider employing first and second isolating voltage divider resistors 22 and 24 and third voltage divider resistor 26 is illustrated in FIG. 2. The output of this voltage divider is a proportion of the battery voltage convenient to utilize in the power limiting circuit 200. In the preferred embodiment, the first and second isolating voltage divider resistors are 1Mµ while the third voltage divider resistor 26 is 20 KΩ. Both first and second isolating voltage divider resistors 22, 24 are employed, in the preferred embodiment, so that the power limiting circuit 200 will not interrupt the ground fault interrupted AC source 2 which is utilized in accordance with the preferred embodiment. It should further be noted that it is contemplated that all of the elements of FIG. 1, with the obvious exception of the AC source 2, are provided in the vehicle 20. However, any of these components could, within the contemplation of the present invention, be supplied externally of the vehicle.

The Construction of the Power Limiting Circuit 200

The power limiting circuit 200 is described in greater detail in FIG. 2 of the present application. A pulse width modulated (PWM) current control signal from the BEMS 10 is supplied to a analog switch level shifter 202. The analog switch level shifter 202 supplies a level shifted pulse width modulated current control signal to the integrator 204 which produces a DC current command signal. In the preferred embodiment the integrator includes an inverting function. The voltage of the vehicle battery 6 is measured by a voltage divider comprising the first and second isolating voltage divider resistors 24, 26, and the third voltage divider resistor 26.

The remainder of the power limiting circuit 200 of FIG. 2 is isolated from the vehicle battery 6 by an isolating voltage follower 206. The output of the isolating voltage follower 206 is a voltage proportional to the voltage of the vehicle batteries 6. The output of the isolating voltage follower 206 is connected to a power limiting characteristic defining circuit 210. The output of the power limiting characteristic defining circuit 210 is supplied to one input of a selective clamping circuit 230. The output of the integrator 204 is supplied to a variable gain amplifier circuit 220 whose output is the limited current command signal provided to the converter control 12 as illustrated in FIG. 1. The output of the variable gain amplifier circuit 220 is also supplied to a second input of the selective clamping circuit 230.

The power limiting characteristic defining circuit 210 receives the vehicle battery voltage signal from the isolating voltage follower 206 via a first power limiting amplification resistor 212 which is connected at a first end to the isolating voltage follower 206 and at a second end to the negative input of a power limiting characteristic defining operational amplifier 211. The output of the power limiting characteristic defining operational amplifier 211 is fed back to this negative input via a second power limiting amplification resistor 214. The first and second power limiting amplification resistors 212, 214 define the amplification factor of the power limiting characteristic defining circuit. Thus, the output of the power limiting characteristic defining operational amplifier 211 varies in relationship to battery voltage.

A first power limiting offset resistor 216 and second power limiting offset resistor 218 provide a reference DC voltage to the positive input of the power limiting characteristic defining operational amplifier 211, to produce an offset voltage at its output. Thus, the power limiting characteristic defining circuit 210 produces an output which varies in proportion to vehicle battery voltage from a set offset value.

The output of the power limiting characteristic defining circuit 210 is supplied to a first input of the selective clamping circuit 230. The output of the integrator 204 is supplied to a variable gain amplifier circuit 220. The variable gain amplifier circuit supplies the output of the integrator 204 to the converter control circuit 12 as illustrated in FIG. 1, selectively attenuating the output of the integrator 204 under control of the selective clamping circuit 230.

The variable gain amplifier circuit 220 includes a first variable gain amplifier resistor 222 connected between the integrator and a negative input of a variable gain operational amplifier 221. The positive input of the variable gain operational amplifier 221 is connected to ground. A second variable gain amplifier resistor 224 is connected between the output and negative input of the variable gain operational amplifier 221. In the preferred embodiment, the first and second variable gain amplifier resistors 222, 224 have the same value so that the variable gain amplifier circuit has a gain of −1.

The selective clamping circuit 230 includes a selective clamping differential amplifier 231. The negative input of the selective clamping differential amplifier 231 receives the output of the power limiting characteristic defining circuit 210 via a first selective clamping input resistor 232. The output of the variable gain amplifier circuit 220 is supplied to the positive input of the selective clamping differential amplifier 231 via a second selective clamping input resistor 234. The selective clamping differential amplifier 231 thereby compares the output of the variable gain amplifier circuit 220 to the output of the power limiting characteristic defining circuit 210.

A selective clamping blocking diode 236 and clamping zener diode 238 are opposingly connected in series between the output and negative input of the selective clamping differential amplifier 231. A stabilizing capacitor 240 is supplied in parallel to the serial connection of the selective clamping blocking diode 236 and clamping zener diode 238. The output of the selective clamping circuit 230 is connected to a current command limiting feedback path 250 which is in turn connected to the negative input of the variable gain operational amplifier 221 of the variable gain amplifier 220. The current command limiting feedback path comprises a feedback blocking diode 252 and feedback gain feedback gain resistor 254. When current is conducted by the feedback blocking diode 252, the effective gain of the variable gain amplifier circuit is attenuated by reducing the gain of the variable gain operational amplifier 221 to less than 1.

Operation of the Power Limiting Circuit

When the BEMS 10 is requesting a current which, at the voltage of the vehicle battery, will produce a power less than the rated output power or design power limit of the controllable power converter 4, the power limiting circuit 200 operates within the maximum current allowable operating range 302 as illustrated in FIG. 3. In this range, the current command signal output from the integrator 204 has a magnitude greater than the value of the output of the power limiting characteristic defining circuit 210. When that current is fed back along the current command limiting feedback path 250, the variable gain amplifier circuit 220 has a gain of −1. Thus, the current command signal from the BEMS 10 is supplied to the converter control 12 without adjustment.

The current command signal is also supplied to the positive input of the selective clamping differential amplifier 231 which receives, at its negative input, the output of the power limiting characteristic defining circuit 210. The power limiting characteristic defining circuit, in the absence of battery voltage, produces a positive voltage at the positive input of the power limiting characteristic defining operational amplifier 211 which is, in the preferred embodiment, the supply voltage of 10 volts times the divider ratio of the divider formed by the first and second power limiting offset resistors 216, 218. This produces a fixed positive voltage at the positive input terminal of the power limiting characteristic defining amplifier.

This positive voltage is reduced, in accordance with the gain factor of the power limiting characteristic defining circuit 210, decreasing the offset voltage produced by the voltage divider including the first and second power limiting offset resistors 216, 218. Thus, with increasing battery voltage, the voltage supplied to the negative input terminal of the selective clamping differential amplifier 231 declines. Accordingly, the output of the power limiting characteristic defining circuit is an amplified difference between the vehicle battery voltage and the offset voltage.

The output of the power limiting characteristic defining circuit 210 is supplied to the selective clamping circuit 230 via a first selective clamping input resistor 232. Similarly, the output of the variable gain amplifier circuit 220 is supplied to the second selective clamping input resistor 234. When the battery voltage is low, the output of the power limiting characteristic defining circuit 210 is high, and would exceed the value supplied to the second selective clamping input resistor, causing the output of the selective clamping differential amplifier 231 to be negative.

Clamping the zener diode prevents the output of the selective clamping differential amplifier 231 from dropping more than a predetermined level below the output of the power limiting characteristic defining circuit, to insure that the output of the selective clamping differential amplifier 231 is sufficiently negative to reverse bias the feedback blocking diode 252 of the current command limiting feedback 250. However, when voltage of the battery increases, the output of the power limiting characteristic defining circuit decreases, thus making it easier for the value supplied by the output of the variable gain amplifier circuit 220, as supplied to the second selective clamping input resistor 234, to exceed the value supplied the first selective clamping input resistor 232 by the power limiting characteristic defining circuit 210.

In other words, as the voltage of the vehicle battery increases, the comparison voltage supplied to the negative input of the selective clamping differential amplifier 231 decreases, making it easier for the output the variable gain amplifier circuit 220, as supplied the second selective clamping input resistor 234, to exceed the value output the power limiting characteristic defining circuit 210. When this happens, the output of the selective clamping differential amplifier 231 goes positive causing the feedback blocking diode 252 to conduct, injecting charge into the negative input of the variable gain amplifier circuit 220 via the feedback gain resistor 254. This reduces the output of the variable gain amplifier circuit 220 to limit the current command signal supplied the converter control 12.

The selective clamping blocking diode 236 prevents this positive voltage from being injected back into the negative input of the selective clamping differential amplifier 231. Thus, when the value of the output of the variable gain amplifier circuit 220 starts to exceed the output of the power limiting characteristic defining circuit 210, the selective clamping circuit 230 reduces the gain of the variable gain amplifier circuit 220 to attenuate the current command signal, preventing the current from exceeding the current command signal clamp level 306 of FIG. 3. Thus, the power output of the controllable power converter 4 is efficiently limited with a relatively simple and inexpensive circuit, and without directly measuring the charged current to the vehicle battery 6.

The invention be thus described, it will be obvious that it may be varied in many ways. Such variations should not be regarded as a departure from the spirit of the instant invention, and all such modifications as would be obvious to one of ordinary skill in art should be found within the scope of the following claims.

I claim:

1. An electric vehicle battery charging system where the batteries of an electric vehicle are charged from an external power source comprising:

a battery energy management system (BEMS) monitoring the vehicle batteries and developing a current control command representing the charging current to be supplied to the vehicle batteries;

a controllable charger having a design power limit, said controllable charger being responsive to current control command from the BEMS, the current control command representing the charging current to be supplied by the controllable charger to the vehicle batteries; and a charger power limiting circuit limiting power supplied by the controllable charger to below the charger design power limit including, a voltage sensor measuring the voltage of the vehicle batteries, and means for modifying the current control command to limit power to below at least an approximation of the design power limit of said charger based on the sensed battery voltage and the battery charging current, said means for modifying using the current control command from the BEMS to represent battery charging current without said controllable charger or charger power limiting circuit directly measuring charging current.

2. The system of claim 1 wherein said means for modifying limits the current control command according to a substantially linear current-voltage curve from the voltage developing the design power limit at a maximum charging current to the current developing the design power limit at a maximum charging voltage.

3. The system of claim 1 wherein said means for modifying includes a power limiting characteristic defining circuit, responsive to the voltage measured by said voltage sensor, and developing a power limiting signal representative of the current needed by the controllable charger to develop a power substantially near said design power limit at the battery voltage sensed by said voltage sensor.

4. The system of claim 3 wherein said means for modifying further includes a current limiting feedback circuit which monitors the current control command and reduces the value of said current control command when the current control command for a given battery voltage exceeds the current represented by the power limiting signal.

5. The system of claim 4 wherein said power limiting characteristic defining circuit includes a differential amplifier, a resistor voltage divider connected to one input of said differential amplifier, and a gain control feedback path controlled gain so that variations in the voltage of the vehicle batteries vary the output voltage of said power limiting amplifier 211 to produce a desired power limiting signal.

6. The system of claim 4 wherein said means for modifying further includes,
a variable gain amplifier generating said current control command,
a selective clamping differential amplifier having said power limiting signal and said current command signal connected to the differential inputs thereof, and
a feedback path provided between the output of said selective clamping differential amplifier and an input of said variable gain amplifier, said feedback path having a feedback blocking diode provided therein to prevent feedback along said path when current flows along said path in a first direction,
said selective clamping differential amplifier having a blocking diode and clamping zener diode serially connected in opposition so that the output of said selective clamping differential amplifier is clamped to a first voltage polarity to reverse bias said feedback blocking diode when said current command signal has a level less than the level of said power limiting signal,
said feedback path providing a feedback signal from said selective clamping differential amplifier in proportion to the difference between said current command signal and said power limiting signal to reduce the gain of said variable gain amplifier in correspondence with this difference when said current command signal has a level greater that said power limiting signal.

7. The system of claim 6 wherein said BEMS produces a pulse width modulated current control signal, said charger power limiting circuit further including,
an analog switch for adjusting the voltage levels of the pulse width modulated signal, and
an integrator for integrating the adjusted pulse width modulated signal into a corresponding D.C. voltage current control signal.

8. A method of charging electric vehicle batteries from an external power source using a controllable charger having a design power limit, comprising:

a) monitoring the vehicle batteries and developing a current control command representing the charging current to be supplied to the vehicle batteries;
b) using the controllable charger to charge said batteries with a current defined by said current control command; and
c) limiting power supplied by the charger to below the charger design power by,
 i) sensing the voltage of the vehicle batteries,
 ii) using the current control command from the BEMS to represent battery charging current without said controllable charger directly measuring charging current, and
 iii) modifying the current control command to limit power to below at least an approximation of the design power limit of said charger.

9. The method of claim 8 wherein said step iii) of modifying limits the current control command according to a substantially linear current-voltage curve from the voltage developing the design power limit at a maximum charging current to the current developing the design power limit at a maximum charging voltage.

10. The method of claim 9 wherein said step iii) of modifying includes,
developing a power limiting signal representative of the current needed by the controllable charger to develop a power substantially near said design power at the battery voltage sensed by said step i) of sensing, and
monitoring the current control command and reducing the value of said current control command when the current control command for a given battery voltage exceeds the current represented by the power limiting signal.

11. In an electric vehicle battery charging system where the batteries of an electric vehicle are charged from an external power source by a controllable charger having a design power limit, said controllable charger being responsive to current control command from a battery energy management system (BEMS), the current control command representing the charging current to be supplied by the controllable charger to the vehicle batteries, a charger power limiter for limiting power supplied by the charger to below the charger design power comprising:
a voltage sensor measuring the voltage of the vehicle batteries; and
means for modifying the current control command to limit power to below at least an approximation of the design power limit of said charger based on the sensed battery voltage and the battery charging current, said means for modifying using the current control command from the BEMS to represent battery charging current without the controllable charger or said charger power limiter directly measuring charging current.

12. The charger power limiter of claim 11 wherein said means for modifying limits the current control command according to a substantially linear current-voltage curve from the voltage developing the design power limit at a maximum charging current to the current developing the design power limit at a maximum charging voltage.

13. The charger power limiter of claim 11 wherein said means for modifying includes a power limiting characteristic defining amplifier, responsive to the voltage measured by said voltage sensor, and developing a power limiting signal representative of the current needed by the controllable charger to develop a power substantially near said design power limit at the battery voltage sensed by said voltage sensor.

14. The charger power limiter of claim 13 wherein said means for modifying further includes a current limiting feedback circuit which monitors the current control command and reduces the value of said current control command when the current control command for a given battery voltage exceeds the current represented by the power limiting signal.

15. The charger power limiter of claim 14 wherein said power limiting amplifier includes a differential amplifier, a resistor voltage divider connected to one input of said differential amplifier and a gain control feedback path providing a controlled gain so that variations in the voltage of the vehicle batteries varies the output voltage of said power limiting amplifier to produce a desired power limiting signal.

16. The charger power limiter of claim 14 wherein said means for modifying further includes, a variable gain amplifier generating said current control command, a selective clamping differential amplifier having said power limiting signal and said current command signal connected to the differential inputs thereof, and a feedback path provided between the output of said selective clamping differential amplifier and an input of said variable gain amplifier, said feedback path having a feedback blocking diode provided therein to prevent feedback along said path when current flows along said path in a first direction, said selective clamping differential amplifier having a blocking diode and clamping zener diode serially connected in opposition so that the output of said selective clamping differential amplifier is clamped to a first voltage polarity to reverse bias said feedback blocking diode when said current command signal has a level less than the level of said power limiting signal, said feedback path providing a feedback signal from said selective clamping differential amplifier in proportion to the difference between said current command signal and said power limiting signal to reduce the gain of said variable gain amplifier in correspondence with this difference when said current command signal has a level greater that said power limiting signal.

17. The charger power limiter of claim 16 wherein said BEMS produces a pulse width modulated current control signal, said charger power limiting circuit further including, an analog switch for adjusting the voltage levels of the pulse width modulated signal, and an integrator for integrating the adjusted pulse width modulated signal into a corresponding D.C. voltage current control signal.

18. In an electric vehicle battery charging system where the batteries of an electric vehicle are charged from an external power source by a controllable charger having a design power limit, said controllable charger being responsive to current control command from a battery energy management system (BEMS), the current control command representing the charging current to be supplied by the controllable charger to the vehicle batteries, a charger power limiting method for limiting power supplied by the charger to below the charger design power comprising: a) sensing the voltage of the vehicle batteries; b) using the current control command from the BEMS to represent battery charging current without said charger directly measuring charging current; and c) modifying the current control command to limit power to below at least an approximation of the design power limit of said charger based on the sensed battery voltage and the battery charging current.

19. The method of claim 18 wherein said step c) of modifying limits the current control command according to a substantially linear current-voltage curve from the voltage developing the design power limit at a maximum charging current to the current developing the design power limit at a maximum charging voltage.

20. The method of claim 19 wherein said step c) of modifying includes, developing a power limiting signal representative of the current needed by the controllable charger to develop a power substantially near said design power limit at the battery voltage sensed by said step a) of sensing, and monitoring the current control command and reducing the value of said current control command when the current control command for a given battery voltage exceeds the current represented by the power limiting signal.

* * * * *